Sept. 7, 1954  F. R. HOHMANN  2,688,469
METHOD AND APPARATUS FOR REFINING MOLTEN GLASS
Filed Nov. 1, 1951  3 Sheets-Sheet 1
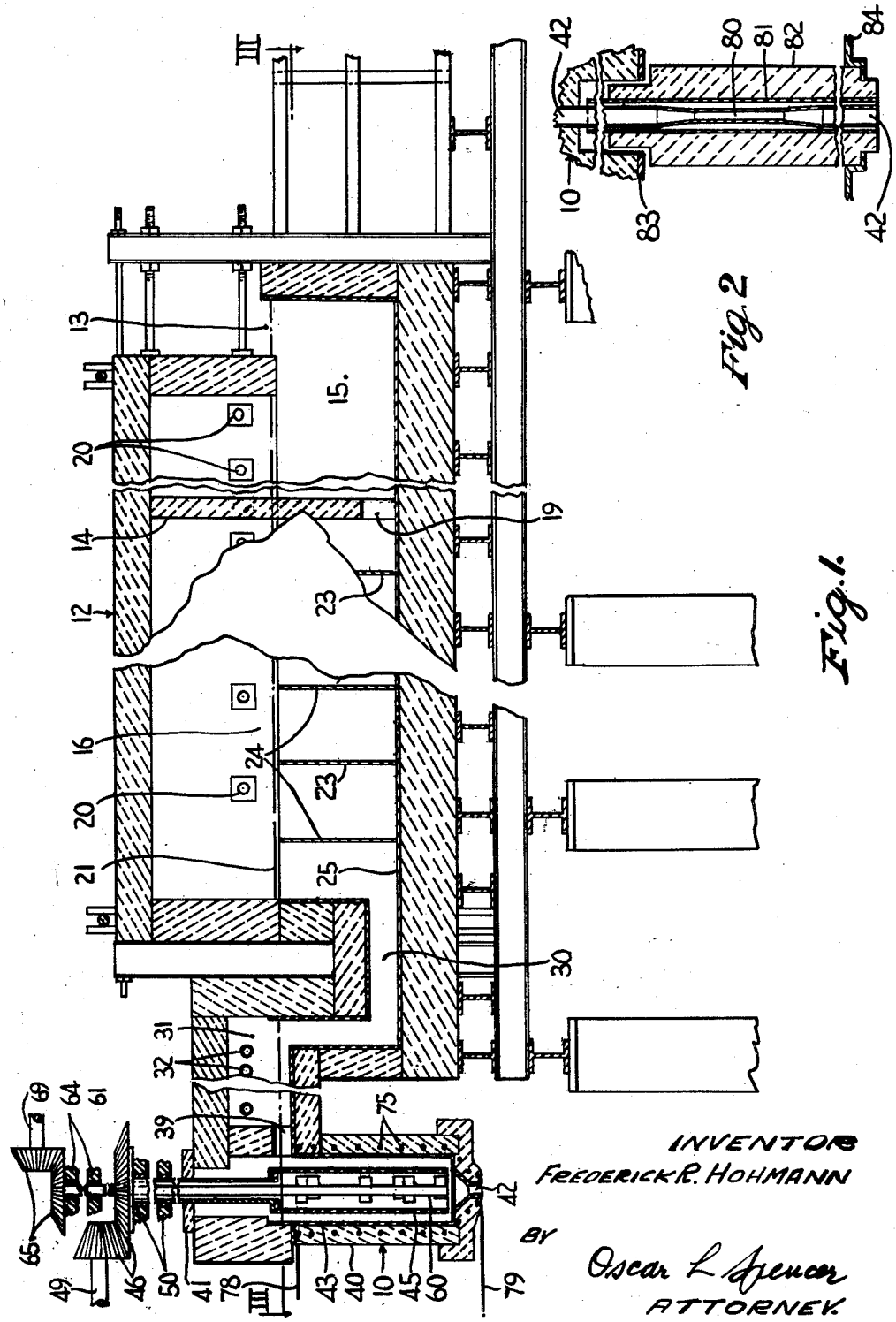

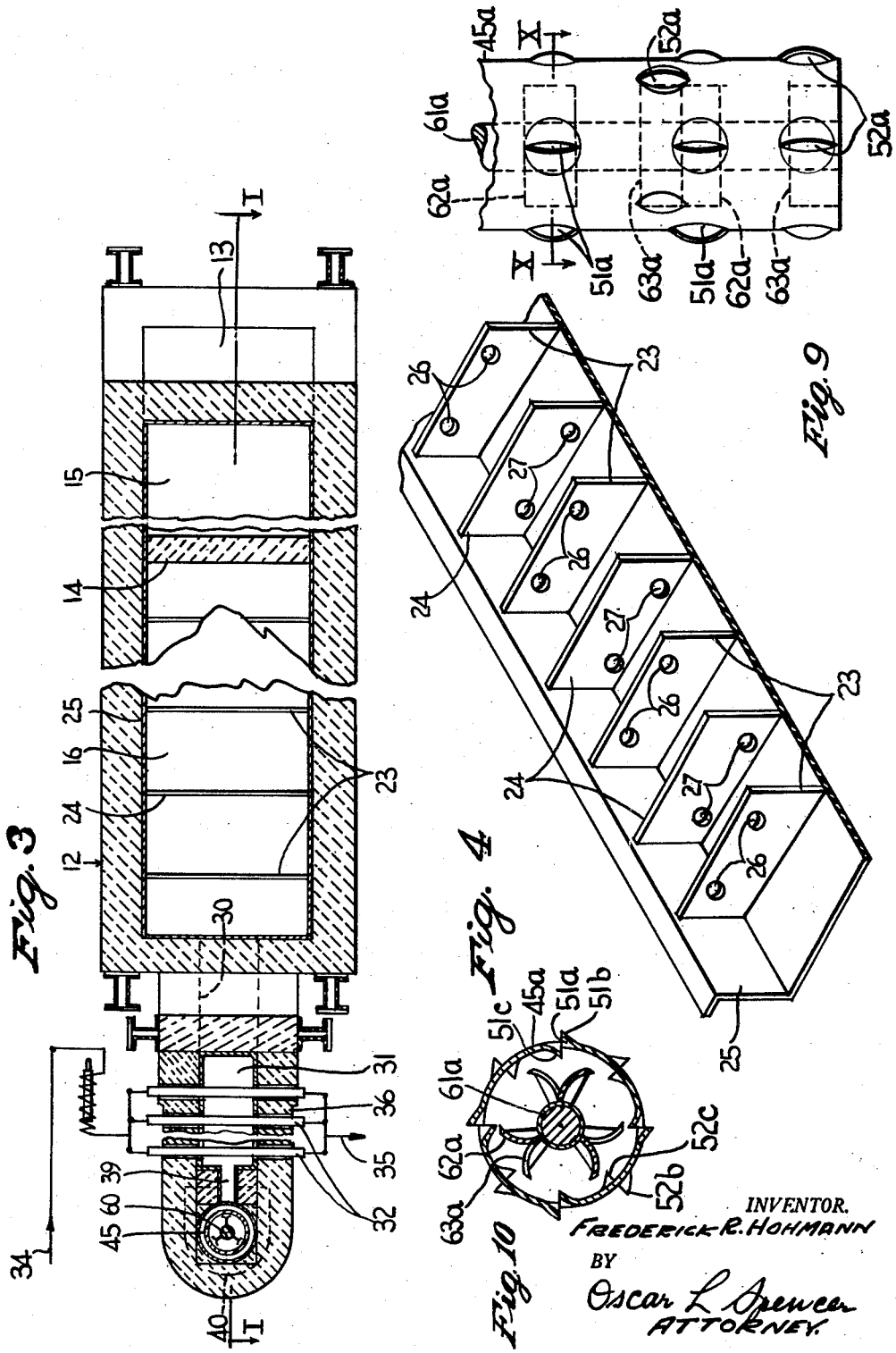

Sept. 7, 1954
F. R. HOHMANN
2,688,469
METHOD AND APPARATUS FOR REFINING MOLTEN GLASS
Filed Nov. 1, 1951
3 Sheets-Sheet 3
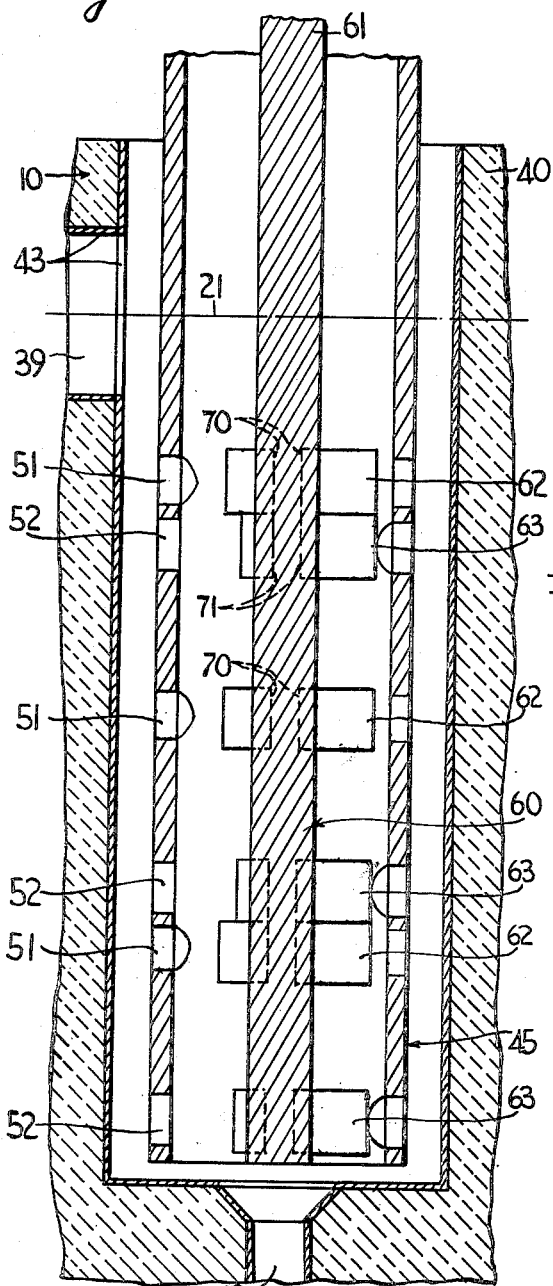
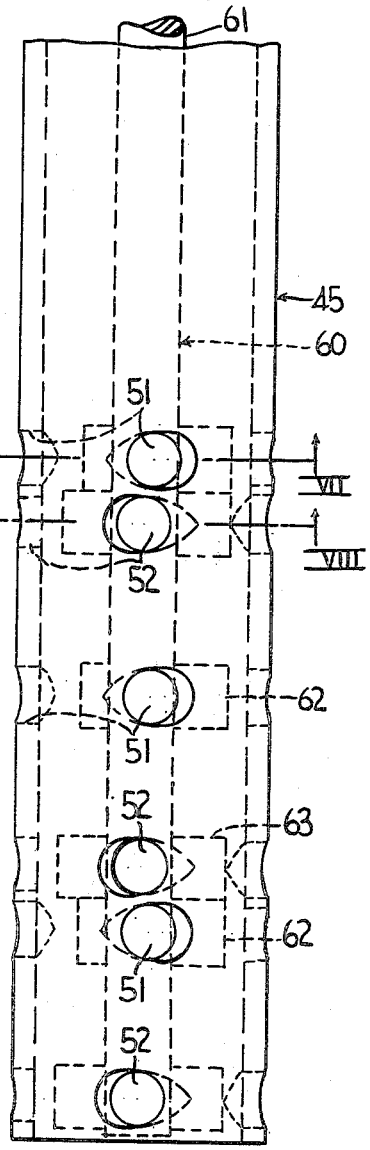
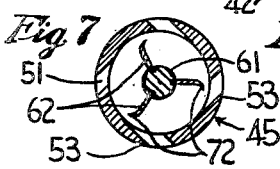
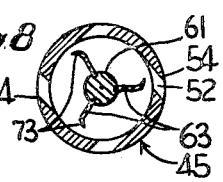
INVENTOR.
FREDERICK R. HOHMANN
BY
Oscar L. Spencer
ATTORNEY.

Patented Sept. 7, 1954

2,688,469

UNITED STATES PATENT OFFICE 2,688,469

METHOD AND APPARATUS FOR REFINING MOLTEN GLASS

Frederick R. Hohmann, New Kensington, Pa., assignor to Pittsburgh Plate Glass Company Application November 1, 1951, Serial No. 254,313

7 Claims. (Cl. 259—6)

This invention relates to the refining of molten glass to produce optimum homogenization thereof, and it has particular relation to a stirring or mixing mechanism designed to effect such homogenization.

One object of the invention is to provide an improved mechanism effective to homogenize a substantially confined column of molten glass as it flows through a confined space from a supply of the molten glass to a discharging outlet.

Another object of the invention is to provide an improved mechanism for controlling homogenizing operations in a mass of molten glass with regard to specific control of the relative flow and mixing of such molten glass in the course of its passage from the inlet to the outlet of a homogenizing chamber.

In one application of the invention, a tank of molten glass melted to proper consistency is supplied to the top of a container in which a column of glass is confined. The container is preferably tubular or cylindrical in form. As the molten glass flows downwardly through the container, it passes a series of rotatably driven stirring members which shear the glass at each member to prevent striae of so-called ream from forming in the glass and to dissipate any striae or ream that may commence to form in the mass of glass.

A number of spaced stirring members in the form of flat strips or plates are mounted on a rotatably driven shaft to constitute one of the features of the homogenizing assembly. The planes of rotation of the members are substantially at right angles to the axis of the driven shaft. However, this angular relation can be varied. The stirring shaft, together with the homogenizing members thereof, is surrounded by a shell of tubular form which in turn can rotate in opposite directions from the rotation of the shaft, or it can rotate in the same direction at the same or at different speeds from the rotation of the shaft. Also one of the rotatable members can be stationary while the other rotates. In such an assembly where one of the members is stationary, it is preferable that the tubular shell be stationary and the shaft rotate in order to secure more satisfactory results.

The tubular shell is spaced materially from the enclosing cylindrical wall of the container into which the mass of molten glass is supplied. Openings are bored through the shell substantially tangentially to the inner surface of such tubular shell wall. Several of these openings can be bored about the circumference of the shell wall adjacent each set of homogenizing members on the stirring shaft.

In the passage of the glass downwardly from top to bottom of the container and through the discharge opening in the bottom thereof, the operation of the stirring shaft and tubular shell causes the glass to pass into and out of the openings in the shell wall. At the same time the glass, while it is inside the tubular shell, is subjected to shearing action at the location of each stirring blade. In this manner the glass is subjected to a thorough homogenizing action and at the time it reaches the discharge opening it is free from striae or ream and is in such refined condition as to be especially adapted for use in manufacturing optical or other precision instruments in which the highest grade of glass is required.

In the drawing:

Fig. 1 is a fragmentary vertical section taken substantially along the line I—I of Fig. 3 illustrating somewhat diagrammatically a melting tank, together with homogenizing mechanism involving the principles of the invention; Fig. 2 is a vertical section of a lower extended portion of the structure shown in Fig. 1 and illustrating a tubular conditioning section that forms a continuation of the homogenizer shown at the left of Fig. 1; Fig. 3 is a fragmentary horizontal section taken substantially along the line III—III of Fig. 1; Fig. 4 is a fragmentary perspective of a metal lining and baffle plates arranged for installation in a glass melting tank; Fig. 5 is a fragmentary vertical section on a larger scale of a homogenizing mechanism; Fig. 6 is a fragmentary side elevation of stirring elements of the homogenizing mechanism; Fig. 7 is a horizontal section on a smaller scale taken substantially along the line VII—VII of Fig. 6; Fig. 8 is a horizontal section on a smaller scale taken substantially along the line VIII—VIII of Fig. 6; Fig. 9 is a fragmentary side elevation similar to Fig. 6 and illustrating an alternate form of stirrer structure; and Fig. 10 is a horizontal section taken substantially along the line X—X of Fig. 9.

In the melting and preparation of glass for treatment in a homogenizing unit 10, glass batch is supplied to a melting tank 12 which is provided with a charging entrance 13 to receive the batch. The tank is divided by means of a transverse upright wall 14 so as to provide a melting chamber 15 and an adjacent refining chamber 16. The molten glass passes through a passageway 19 leading from the chamber 15 to the chamber 16. Heat by gas combustion is supplied from gas burner nozzles 20 in the wall of the tank above the glass level which is indicated at 21. An example of this general type of gas heating installation for melting glass is shown in U. S. Patent 2,539,145 dated January 23, 1951.

In the refining chamber 16 molten glass is directed along an irregular or sinuous path by means of upright baffles 23 and 24 placed transversely of the chamber 16 and across the direction of flow of the molten glass therethrough. The baffles themselves and a lining 25 in which the baffles are mounted for containing the molten glass, are composed of highly resistant metal, such as platinum. Alternate baffles 23 and 24 are formed with upper openings 26 and lower openings 27, respectively, so that the glass passes upwardly and through the openings 26, thence downwardly and through the lower openings 27. The upward and downwardly flowing movement is repeated until the glass is directed through a relatively narrow passage 30 from which the glass enters a conditioning chamber 31 in which the temperature of the glass is uniformly controlled. This chamber is provided with so-called glow bars 32 constituting resistance elements through which electric current is passed from electric supply mains 34 and 35. These bars 32 extend horizontally entirely across the width of the chamber 31 above the glass line and their end portions project through walls 36 of the tank structure.

Molten glass passes from the conditioning chamber 31 into a passage 39 leading to the homogenizing unit 10 which is circular in cross sectional contour. The homogenizing unit comprises a stationary upright container 40 the upper end of which is covered with a refractory cap 41 and the lower end of which is provided with a discharge opening 42 from which the completely refined glass is collected and disposed of as desired. The passage 39 and the inner walls of the container 40 are faced with platinum lining 43 which is a continuation of the lining 25. The inner wall of the container preferably is cylindrical although it is to be understood that if desired the container chamber can be square or can be in any other polygonal cross sectional form.

A rotatable stirrer 45 in the form of a tubular shell is mounted substantially coaxially with respect to the upright container 40 and extends from a point adjacent the bottom of the container upwardly through the cap 41. Conventional gearing elements 46 connected at the upper end portion of the stirrer 45 are connected to a driven shaft 49 which rotatably operates the stirrer about a vertical axis. Suitable stationary bearings 50 rotatably support the tubular stirrer. It is to be understood that a conventional variable speed reversible motor (not shown) can be selected for driving the stirrer at any speed that may be desired for optimum results.

At locations below the glass level, the tubular stirrer shell 45 is provided with spaced sets of openings 51 and 52 which are bored through the shell wall in such manner that each wall opening is substantially tangent to the inner cylindrical shell wall. The openings 52 are bored in reversed direction to the boring of the openings 51. All of these openings are bored substantially in horizontal directions although at different relative angles. The openings 51 and 52 are alternately arranged as to directional boring as shown in Fig. 5. Each opening 51, as a result of the direction of boring, defines a sharp edge 53 which, as viewed in cross section (Fig. 5), points in a counterclockwise direction. In other words, the axis of boring of each opening 51 is directed at an angle of approximately 45° to the radius drawn from the vertical axis of the tube and passing centrally (though not axially) through the opening.

The openings 52 are bored in symmetrical relation, but in opposite directions to the openings 51, as indicated above, so as to provide sharp edges 54 pointing in a clockwise direction (Fig. 8). The axis of boring of each opening 52 is likewise directed at an angle of approximately 45° to a radius drawn from the vertical axis of the tubular member and passing centrally through the opening. In this manner of boring the openings 51 and 52, they are so formed as to provide the tangential relationship specified. In other words, one side of the cross sectional area of each opening is directed substantially tangentially to a circle defined by the inner cross sectional line of the wall of the tubular shell.

A coacting stirrer 60, including a vertical driven shaft 61 and sets of stirring blades 62 and 63, is mounted inside the tubular shell 45 in substantially coaxial relation thereto. The shaft 61 is mounted in stationary bearings 64 and is provided at its upper end portion with gearing elements 65 actuated by a rotatably driven shaft 69. It is to be understood that the shaft 61 can be rotatably driven in either direction at variable speed by a conventional variable speed reversible motor.

The shaft 61, together with the blades 62 and 63, is composed of highly resistant metal, preferably platinum, and the strip metal material of each blade is arranged on edge; that is, in substantially vertical planes. The relatively narrow blades 62 and 63 project radially from the shaft and are rigidly connected thereto as indicated at 70 and 71, respectively. As shown in Figs. 7 and 8, the blades 62 are formed with outer end portions 72 which are curved in a clockwise direction, whereas the blades 63 of the other sets are formed with end portions 73 which are curved in a counterclockwise direction. These clockwise and counterclockwise directions are defined with reference to the rotation of the vertical shaft 61 as viewed from above. The horizontal planes of rotation of the sets of blades 62 are substantially coincident with the horizontal planes passing through the respective sets of openings 51. Likewise, the horizontal planes of rotation of the sets of blades 63 are substantially coincident with the horizontal planes passing through the sets of openings 52.

In rotating the stirrer shell 45 in a counterclockwise direction (Fig. 7), the openings 51 including the sharp leading edges 53 operate to draw streams of molten glass inwardly into such shell, and this action is augmented by the actuation of the adjacent blades 62 on the shaft 61, which, in one phase of operation, rotates in a clockwise direction.

Conversely, during such operation the openings 52, including the sharp edges 54 which are directed in reversed directions with respect to the edges 53, expel molten glass from the inside to the outside of the shell 45. Since the curved end portions 73 of the blades 63 are pointed rearwardly with respect to the direction of rotation in this phase of operation, these blades aid in expelling the molten glass from the shell through the openings 52. This alternate drawing in and expelling of the glass through the openings 51 and 52, together with the shearing action of the blades 62 and 63, thoroughly homogenize the molten glass flowing downwardly from the top to the bottom of the container 40. It is to be understood that relative rotation of the shell 45 and shaft 61 may be reversed, or one of these elements may rotate at greater speed than the other. Under certain conditions, the shell 45 can be maintained stationary while rotating the shaft 61 in either direction. In this mode of operation the blades 62 and 63 operate to force the glass inwardly and outwardly through the openings 51 and 52.

Additional heat can be applied about the container 40 by means of electric heating coils 75 which are connected to conventional mains 78 and 79 to supply electric energy to the coils. An example of a heating installation of this type is shown in U. S. Patent 1,956,171, dated April 24, 1934, and hence a detailed description of the electric installation is not necessary for a thorough understanding of this phase of the invention.

In the preferred mode of operation of the apparatus described, molten glass flows continuously into the homogenizer 10 and through the tubular outlet 42 which is in the form of a platinum tube extending a considerable distance below the bottom of the homogenizer. In order that the molten glass may be maintained at such consistency as to be properly responsive to the stirring action in the homogenizer, the heating coils 75 are energized so that the molten glass, while being subjected to the stirring action, is maintained at a temperature of approximately 2250° F. to 2500° F. On the other hand, molten glass at such high temperatures is not properly adapted to be fed to a gobbing machine because it flows too freely. Therefore, the temperature of the glass is reduced materially before it is discharged from the lower end of the tubular outlet 42. It has been further desirable to employ a tubular outlet 42 sufficiently long to insure reduction of the temperature therein from 2250°–2500° F. to 1900°–2000° F. The feeding of the glass through this extended outlet and the controlling thereof to proper temperature is facilitated by providing an intermediate section 80 that has a diameter approximately one-half of the maximum diameter of the tubular outlet 42. A protective tube 81 surrounds the platinum outlet tube 42 and suitable refractory bodies 82 are provided for supporting the protective tube below the homogenizer 10. Supports for the refractory bodies are indicated diagrammatically at 83 and 84.

In the form of stirring apparatus shown in Figs. 9 and 10, a tubular shell 45a can be substituted for the shell 45 and is adapted to be rotatably driven in the same manner as the latter. Spaced rows of openings 51a and 52a are formed in the wall of the shell 45a by vertically splitting portions of the wall and then forcing wall portions on opposite sides of the split area in opposite directions to form outwardly projecting flanges or vanes 51b and inwardly projecting vanes 51c at the openings 51a. Likewise, outwardly projecting vanes 52b and inwardly projecting vanes 52c are formed in the same manner at the openings 52a. In adjacent rows of openings 51a and 52a, the respective vanes are arranged so that the openings face circumferentially in opposite directions. The action of these vanes can be understood by viewing Fig. 10. As viewed in this figure, when the tubular shell 45a is rotated in a counterclockwise direction, the vanes 51b scoop the molten glass inwardly into the shell. On the other hand, the vanes 52c directed inwardly intercept the molten glass on the inside of the tubular shell and by a scooping action force it outwardly through the openings 52a. This action occurs alternately and around the circumference of the shell as the molten glass proceeds from the upper end of the homogenizer to the discharge end thereof. If the direction of rotation of the tubular shell is reversed, the action of the vanes, of course, is likewise reversed.

Further homogenization of the molten glass can be effected inside the tubular shell by operating a stirrer 61a which corresponds substantially to the stirrer 61. This stirrer 61a is provided with blades 62a and 63a which correspond substantially to the blades 62 and 63 previously described. Further explanation thereof is therefore not believed to be necessary for a thorough understanding of this phase of the invention.

Under certain conditions, in each form of homogenizer shown, it may be desirable to flow the glass from the lower end of the homogenizer to the upper end thereof; that is, the procedure shown and described with regard to the passage of glass through the homogenizer can be reversed.

Although a practical application of the invention has been shown and described in detail, it will be apparent to those skilled in the art that the invention is not so limited but that various changes can be made therein without departing from the spirit and/or scope of the invention as exemplified in the appended claims.

I claim:

1. In a method of refining glass melted and conditioned to predetermined temperature in a glass melting tank, the steps which comprise flowing a mass of the molten glass in the form of substantially enclosed concentric columns from an upper supply area to a lower discharging area, stirring the outer areas of the outer column of glass in one direction and simultaneously stirring the central areas of the inner column in the opposite direction in progressively repeated operations from the upper to the lower portion of said columns until the glass is discharged from the lower end of the columns.

2. In a method of refining glass melted and conditioned to predetermined temperature in a glass melting tank, the steps which comprise flowing a mass of the molten glass in the form of substantially enclosed concentric columns from an upper supply area to a lower discharging area, alternately drawing the outer areas of the column of glass inwardly toward the central portion thereof and forcing the central areas of the column outwardly to the outer areas thereof in progressively repeated operations until the glass is discharged from the lower end of the column, and shearing the glass column repeatedly as it moves alternately inwardly and outwardly toward and away from the central portion thereof.

3. In an apparatus for refining molten glass supplied from a melting and conditioning tank, an upright substantially imperforate walled container having a predetermined glass level, means for supplying molten glass to the upper portion of said container, means for discharging the molten glass at the bottom portion of the container while maintaining the container substantially filled to said level with molten glass, a tubular shell disposed upright in the container substantially from the top to the bottom thereof with the outer walls of the shell spaced materially from the inner walls of the container, said shell having a series of openings disposed laterally through the walls thereof below the glass level in said container, and means for passing molten glass repeatedly into and out of the shell through said openings as the molten glass passes downwardly from top to bottom of said container.

4. In an apparatus for refining molten glass supplied from a melting and conditioning tank, an upright imperforate walled container having means for receiving molten glass at its upper portion at predetermined glass level and having means for discharging the molten glass at the bottom portion thereof while maintaining the container substantially filled to said level with molten glass, a tubular shell disposed upright in the container substantially with the outer walls of the shell spaced materially from the inner walls of the container, said shell having spaced rows of openings disposed laterally through the walls thereof below the glass level in said container, and means for passing molten glass repeatedly into and out of the shell through said rows of openings as the molten glass passes downwardly from top to bottom of said container.

5. In an apparatus for refining molten glass supplied from a melting and conditioning tank, an upright substantially closed container having means for receiving molten glass at its upper portion and having means for discharging the molten glass at the bottom portion thereof while maintaining the container substantially filled with molten glass, a rotatable tubular shell disposed upright in the container with the outer walls of the shell spaced materially from the inner walls of the container, said shell having a series of openings disposed laterally through the walls thereof below the glass level in said container, and means for rotating the shell and causing the molten glass to move repeatedly into and out of the shell through said openings while passing downwardly from top to bottom of said container.

6. In an apparatus for refining molten glass supplied from a melting and conditioning tank, an upright substantially closed container having means for receiving the molten glass at its upper portion and having at its lower portion a glass discharging means operable while the container is maintained substantially filled with molten glass, a tubular shell disposed upright in said container, rows of openings disposed circumferentially about the shell, the several rows being spaced between the top and bottom of said shell, the axial bore of each opening being substantially tangential to the inner circumferential surface of the shell wall, the direction of boring of openings in one row being substantially reversed with reference to the direction of boring of openings of an adjacent row, and means for agitating the molten glass inside said shell.

7. In an apparatus for refining molten glass supplied from a melting and conditioning tank, an upright container having means for receiving the molten glass at the upper portion thereof and having means for discharging the glass at the bottom thereof while maintaining the container substantially filled with molten glass, a tubular shell disposed within said container in spaced relation to the walls thereof, said shell having spaced openings disposed between the top and bottom thereof, an upright stirring device disposed within the tubular shell for causing the passage of molten glass laterally into and out of the shell through said openings, and means for relatively rotating the shell and stirring device.

References Cited in the file of this patent

UNITED STATES PATENTS

| Number | Name | Date |
| --- | --- | --- |
| 1,982,002 | Hatch | Nov. 27, 1934 |
| 2,040,789 | Honiss | May 12, 1936 |
| 2,072,807 | Bailey | Mar. 2, 1937 |
| 2,212,528 | Slayter | Aug. 27, 1940 |
| 2,411,031 | Deyrup | Nov. 12, 1946 |
| 2,515,478 | Tooley et al. | July 18, 1950 |
| 2,515,481 | Wiley et al. | July 18, 1950 |
| 2,569,459 | De Voe | Oct. 2, 1951 |

FOREIGN PATENTS

| Number | Country | Date |
| --- | --- | --- |
| 711,976 | France | July 8, 1931 |
| 831,332 | France | June 7, 1938 |